United States Patent Office 3,348,999
Patented Oct. 24, 1967

3,348,999
COMPOSITIONS TO ENHANCE THE LEARNING RATE AND RETENTION LEVEL IN ANIMALS COMPRISING 2-IMINO-5-PHENYL-4-OXAZOLIDINONE AND A RELATIVELY INSOLUBLE BASE
Eugene Leo Woroch, Itasca, and William Donald Smart, Waukegan, Ill., assignors to Abbott Laboratories, Chicago, Ill., a corporation of Illinois
No Drawing. Filed Feb. 10, 1966, Ser. No. 526,345
3 Claims. (Cl. 167—65)

The present invention relates to pharmaceutical compositions and more particularly to pharmaceutical compositions having an enhancing effect on the learning rate and retention level of animals.

The present invention comprises pharmaceutical compositions containing as one ingredient 2-imino-5-phenyl-4-oxazolidinone of the formula,

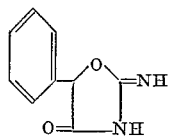

which is a known central nervous system stimulant, and a compound which potentiates said drug especially with respect to its enhancement of learning rate and retention level in animals. The potentiating compounds utilized in the compositions in accordance with this invention are relatively insoluble bases of the alkaline earth metals, aluminum and similar metals, said compounds having a solubility product constant (KSP) of less than $10^{-4}$ and, of course, being acceptable to the animal system without causing deleterious effects. Examples of undesirable bases are those in which the cation is barium, beryllium, cadmium, or lithium. Suitable compounds are, for example, magnesium hydroxide (KSP=$4 \times 10^{-14}$) and carbonate (KSP=$2.6 \times 10^{-5}$), calcium carbonate (KSP=$1 \times 10^{-8}$), hydroxide (KSP=$1 \times 10^{-9}$), and aluminum hydroxide (KSP=$4 \times 10^{-13}$). The compounds are combined with the 2-imino-5-phenyl-4-oxazolidinone in the ratio of at least 0.05 mole of the base to one mole of the drug.

It has been found that the administration to warm-blooded animals of 2-imino-5-phenyl-4-oxazolidinone results in an increased rate of learning by the animal together with a prolonged period of retention of the learned behavior. It was also found that an even greater enhancement of acquisition and retention of a learned response resulted upon administration of a composition of the present invention.

While it is not intended to rely upon any particular theory to explain the potentiating effect of the noted compounds, it is believed that since the imino group of 2-imino-5-phenyl-4-oxazolidinone readily hydrolyzes to the dione in an acid medium, gelatinous, relatively insoluble bases such as magnesium hydroxide, calcium carbonate, or aluminum hydroxide coat the drug and prevent hydrolysis or at least retard it until the drug is absorbed into the system.

The behavioral effects resulting from administration of the compositions of the present invention to rats and dogs were evaluated by determining the acquisition and retention of a conditioned avoidance response by the animals. A markedly shortened escape time was found to result in both the acquisition test and retention trials in rats treated with 2-imino-5-phenyl-4-oxazolidinone over a dosage range of 10 to 40 mg./kg. intraperitoneally and 2.5 to 50 mg./kg. orally. Pretreatment of the rats during the training trials both orally and intraperitoneally resulted in markedly increased acquisition rates in comparison to control rats treated with saline solution. Treatment also resulted in markedly prolonged retention of learned performance, up to six months following drug administration. Comparable studies carried out with d-desoxyephedrine hydrochloride and methyl-$\alpha$-phenyl-$\alpha$-(2-piperidyl)acetate, which are known central nervous system stimulants or antidepressants, did not show any significant increase in acquisition rate or retention level of avoidance response compared to saline-treated animals.

While administration of 2-imino-5-phenyl-4-oxazolidinone resulted in a markedly shortened escape time, an even greater enhancement of acquisition and retention of the jump-out response was found to result upon administration of a combination of 2-imino-5-phenyl-4-oxazolidinone and magnesium hydroxide, said combination comprising about 75% 2-imino-5-phenyl-4-oxazolidinone and 25% magnesium hydroxide. In several studies, significant enhancement was observed with the combination material at doses of 1.25 and 2.5 mg./kg. orally. In contrast, 2-imino-5-phenyl-4-oxazolidinone showed its most significant enhancement at doses of 10 and 20 mg./kg. orally. Lower doses of 2-imino-5-phenyl-4-oxazolidinone (2.5 and 5.0 mg./kg. orally) did not enhance acquisition or retention. With respect to acquisition, the approximate potency difference between the two materials was found to be at least fourfold Thus, rats treated with the combination material reach criterion of learning by the sixth trial at a dose of 2.5 mg./kg. while rats treated with 2-imino-5-phenyl-4-oxazolidinone reached criterion of learning by the fourth trial at a dose of 10 mg./kg. The potency difference between the two materials with respect to retention of the learned response was found to be even greater, being approximately eightfold. While significant retention of the jump-out response was observed at a dose of 1.25 mg./kg. in animals treated with the combination material, animals treated solely with 2-imino-5-phenyl-4-oxazolidinone showed significant retention only at a dose of 10 mg./kg.

The effects of the previously-described combination on the acquisition of a simple hurdle-crossing avoidance task were studied in 40 dogs. The testing equipment consisted of a rectangular test chamber subdivided into two compartments by a low hurdle. A gate (placed on top of the hurdle) operated by pulley prevented the animal from making premature avoidance response. The testing sequence (30 seconds) consisted of placing the dog in the left compartment for 15 seconds (the gate over the hurdle is raised during the entire period of the test sequence) followed by 10 seconds of buzzer stimulation and 5 seconds of buzzer-and-shock stimulation. Ten trials were employed per day during the acquisition trials. The combination (at doses of 20, 10, 5, 2.5, and 1.25 mg./kg.) was prepared in tragacanth suspension and administered by the oral route two hours prior to acquisition trials. A separate dose was tested at weekly intervals in a group of four dogs and compared to a control group of four dogs pretreated with tragacanth. The actual escape times in seconds were determined for each acquisition trial.

From the foregoing study, it was apparent that the group of dogs given 20 mg./kg. of the combination comprising about 75% 2-imino-5-phenyl-4-oxazolidinone and about 25% magnesium hydroxide did not meet the criterion of acquisition and were actually inhibited in performing the avoidance response. The animals were observed to experience unusual head movements and restless pacing so that it would appear that the stimulant effect of the drug interferes with acquisition of the response. A dose of 10 mg./kg. did not interfere with acquisition of the response but at the same time did not appear to facilitate acquisition. Symptoms of head movements and restless pacing were still present although less prominent than that observed at 20 mg./kg.

At doses of 2.5 and 5.0 mg./kg., marked enhancement of acquisition of the response was observed. Criterion of learning was reached by the second and third trial as contrasted to the seventh and eighth trials for the control groups. No overt stimulant effects were observed at these dosage levels so that it is apparent that the stimulant effects of the drug can clearly be separated from the enhancement of learning effects.

In the foregoing studies, the compositions were administered by dispersing them in a liquid carrier. It should be understood, however, that the present invention contemplates providing the active compound in the form of a granulation, tablets, capsules, elixirs, emulsions, and other dosage forms well known to the art. While oral administration is preferred and is the most convenient, other means of administration may be employed, such as, for example, by injection, intraperitoneal, intramuscular; or, if desired, the active ingredients can be incorporated in an oil or wax base and administered in the form of a suppository.

*Example 1*

A suitable capsule mixture formula for 100 capsules of the composition comprising an equimolar mixture of 2-imino-5-phenyl-4-oxazolidinone and magnesium hydroxide is as follows:

|   | Grams |
|---|---|
| 2-imino-5-phenyl-4-oxazolidinone | 3.76 |
| Magnesium hydroxide | 1.24 |
| Lactose | 15.00 |
|   | 20.00 |

The mixture of 2-imino-5-phenyl-4-oxazolidinone and magnesium hydroxide (75.3% and 24.7% by weight, respectively) are mixed in a ball mill. The lactose is added and the ingredients are thoroughly mixed and placed in a gelatin capsule. Each capsule will provide 50 milligrams of the combination material.

*Example 2*

In illustration of the tablet dosage form for the composition comprising an equimolar mixture of 2-imino-5-phenyl-4-oxazolidinone and magnesium hydroxide, the following is a formula for 100 tablets:

|   | Grams |
|---|---|
| 2-imino-5-phenyl-4-oxazolidinone | 0.75 |
| Magnesium hydroxide | 0.25 |
| Lactose | 30.00 |
| Corn starch | 16.50 |
| Talc | 2.00 |
| Magnesium stearate | 0.50 |
|   | 50.00 |

The tablets are prepared by mixing the 2-imino-5-phenyl-4-oxazolidinone and magnesium hydroxide in a ball mill. The lactose is added and the ingredients are thoroughly mixed. The mixture is then granulated with a corn starch paste by dissolving 3 grams of corn starch in 30 cc. of water. The granulated mixture is dried thoroughly. To the granulation is added the talc, magnesium stearate, and the remainder of the corn starch. After thorough mixing, the tablets are compressed in a conventional tableting machine. Each tablet will provide 10 mg. of the 2-imino-5-phenyl-4-oxazolidinone and magnesium hydroxide combination.

In like manner, other bases such as magnesium carbonate, calcium carbonate, or aluminum hydroxide may be compounded in similar formulations in the described ratios together with 2-imino-5-phenyl-4-oxazolidinone.

The compounds of this invention have been found to be effective when administered orally to rats in the dosage range of from 1.25 to 50 mg./kg. but can be administered orally to other warm-blooded animals in the dosage range of about 10 to 50 mg. per day. In smaller animals other than rats, usually about half the above dose will suffice, i.e., from about 5 mg. to about 25 mg. per day. It is desirable that the described compositions be administered at a dosage level effective to enhance learning rate and memory retention without at the same time producing any substantial stimulant effects.

Others may practice the invention in any of the numerous ways which will be suggested by this disclosure to one skilled in the art. All such practices of the invention are considered to be a part thereof provided they fall within the scope of the appended claims.

What is claimed is:

1. A pharmaceutical composition in dosage unit form and effective to enhance the learning rate and retention level in animals comprising about 5 to 50 milligrams of a combination of 2-imino-5-phenyl-4-oxazolidinone and a relatively insoluble base selected from the group consisting of magnesium hydroxide, magnesium carbonate, calcium carbonate, and aluminum hydroxide, said base being combined in the ratio of at least 0.05 mole of the base to one mole of the 2-imino-5-phenyl-4-oxazolidinone; and a pharmaceutically-acceptable carrier.

2. The pharmaceutical composition of claim 1 wherein the relatively insoluble base is magnesium hydroxide.

3. The pharmaceutical composition of claim 1 wherein the relatively insoluble base is magnesium hydroxide, said magnesium hydroxide being combined in the ratio of about one mole of said magnesium hydroxide to one mole of the 2-imino-5-phenyl-4-oxazolidinone.

References Cited

Chem. Abstracts, 51, page 15805e (1957).

ALBERT T. MEYERS, *Primary Examiner.*

S. FRIEDMAN, *Assistant Examiner.*